US009967162B2

(12) United States Patent
Spinelli et al.

(10) Patent No.: US 9,967,162 B2
(45) Date of Patent: May 8, 2018

(54) GENERIC DISCOVERY FOR COMPUTER NETWORKS

(71) Applicant: BMC Software, Inc., Houston, TX (US)

(72) Inventors: Lionel Spinelli, Aubagne (FR); Jean-Claude Chabrier, Vitrolles (FR); Pierre Germain, les Pennes Mirabeau (FR)

(73) Assignee: BMC Software, Inc., Houston, TX (US)

( * ) Notice: Subject to any disclaimer, the term of this patent is extended or adjusted under 35 U.S.C. 154(b) by 672 days.

(21) Appl. No.: 14/164,524

(22) Filed: Jan. 27, 2014

(65) Prior Publication Data
US 2014/0143416 A1 May 22, 2014

Related U.S. Application Data

(63) Continuation of application No. 11/295,363, filed on Dec. 6, 2005, now Pat. No. 8,683,032.

(60) Provisional application No. 60/633,625, filed on Dec. 6, 2004.

(51) Int. Cl.
*H04L 12/26* (2006.01)
*H04L 29/06* (2006.01)
*H04L 12/24* (2006.01)
*H04L 29/08* (2006.01)

(52) U.S. Cl.
CPC .......... *H04L 43/0811* (2013.01); *H04L 29/06* (2013.01); *H04L 41/12* (2013.01); *H04L 41/14* (2013.01); *H04L 67/16* (2013.01); *H04L 43/10* (2013.01); *H04L 69/329* (2013.01)

(58) Field of Classification Search
CPC .... H04L 29/08072; H04L 29/06; H04L 43/00
USPC ........................................................ 709/224
See application file for complete search history.

(56) References Cited

U.S. PATENT DOCUMENTS

| 5,761,505 | A | 6/1998 | Golson et al. |
| 5,948,055 | A | 9/1999 | Pulsipher et al. |
| 5,991,877 | A | 11/1999 | Luckenbaugh |
| 6,041,058 | A | 3/2000 | Flanders et al. |

(Continued)

OTHER PUBLICATIONS

"BMC Atrium CMDB 7.5.00 Patch 001, Normalization and Reconciliation Guide", 132 pages, Mar. 2009.

(Continued)

*Primary Examiner* — Alan S Chou
(74) *Attorney, Agent, or Firm* — Brake Hughes Bellermann LLP

(57) ABSTRACT

A generic discovery methodology collects data pertaining to components of a computer network using various discovery technologies. From the collected data, the methodology identifies, filters and analyzes information related to inter-component communications. Using the communication and application information, the methodology determines reliable relationships for those components having sufficient information available. To qualify more components, the methodology implements a decision service to generate hypothetical relationships between components that are known and components that are unqualified or unknown. The hypothetical relationships are presented to a user for selection, and each hypothetical relationship is preferably associated with an indication of its reliability.

21 Claims, 14 Drawing Sheets

(56) References Cited

U.S. PATENT DOCUMENTS

| | | |
|---|---|---|
| 6,212,266 B1 | 4/2001 | Busuioc |
| 6,266,513 B1 | 7/2001 | Briancon |
| 6,286,047 B1 | 9/2001 | Ramanathan et al. |
| 6,336,138 B1 | 1/2002 | Caswell et al. |
| 6,496,838 B1 | 12/2002 | Zamora-McKelvy et al. |
| 6,820,090 B2 | 11/2004 | Chambers et al. |
| 6,836,798 B1 | 12/2004 | Adams |
| 7,003,402 B2 | 2/2006 | Christie et al. |
| 7,082,426 B2 | 7/2006 | Musgrove et al. |
| 7,146,380 B2 | 12/2006 | Schaepe et al. |
| 7,155,427 B1 | 12/2006 | Prothia et al. |
| 7,346,044 B1* | 3/2008 | Chou .................. H04L 12/66 370/352 |
| 7,380,025 B1 | 5/2008 | Riggins et al. |
| 7,395,256 B2 | 7/2008 | Ji et al. |
| 8,166,002 B2 | 4/2012 | Robinson et al. |
| 9,323,801 B2 | 4/2016 | Morozov et al. |
| 2002/0002555 A1 | 1/2002 | Wolman et al. |
| 2002/0009085 A1 | 1/2002 | Barkai et al. |
| 2002/0143935 A1 | 10/2002 | Schenkel et al. |
| 2002/0184529 A1* | 12/2002 | Foster .................. H04L 49/357 726/4 |
| 2003/0058813 A1 | 3/2003 | Viola et al. |
| 2003/0126108 A1 | 7/2003 | Martino et al. |
| 2003/0200294 A1 | 10/2003 | Thorpe et al. |
| 2004/0019672 A1 | 1/2004 | Das et al. |
| 2004/0025157 A1 | 2/2004 | Blight et al. |
| 2004/0143600 A1 | 7/2004 | Musgrove et al. |
| 2004/0146008 A1 | 7/2004 | Conradt et al. |
| 2004/0220963 A1 | 11/2004 | Chen et al. |
| 2004/0264435 A1 | 12/2004 | Chari et al. |
| 2005/0038889 A1 | 2/2005 | Frietsch |
| 2005/0080613 A1 | 4/2005 | Colledge et al. |
| 2005/0111362 A1* | 5/2005 | Freytsis ............... H04L 47/564 370/230 |
| 2005/0216433 A1 | 9/2005 | Bland et al. |
| 2005/0234973 A1 | 10/2005 | Zeng et al. |
| 2006/0059253 A1* | 3/2006 | Goodman ............ G06Q 10/10 709/223 |
| 2006/0064481 A1 | 3/2006 | Baron et al. |
| 2006/0069801 A1 | 3/2006 | Rich et al. |
| 2006/0080656 A1 | 4/2006 | Cain et al. |
| 2006/0106590 A1* | 5/2006 | Tseng .................. G06F 8/70 703/20 |
| 2006/0123393 A1 | 6/2006 | Atkins et al. |
| 2006/0136459 A1 | 6/2006 | Trinon et al. |
| 2006/0136585 A1 | 6/2006 | Mayfield et al. |
| 2006/0178954 A1 | 8/2006 | Thukral et al. |
| 2006/0179124 A1 | 8/2006 | Stefaniak et al. |
| 2006/0271341 A1 | 11/2006 | Brown et al. |
| 2007/0097959 A1 | 5/2007 | Taylor |
| 2007/0239700 A1 | 10/2007 | Ramachandran |
| 2008/0021917 A1 | 1/2008 | Baker et al. |
| 2008/0183724 A1 | 7/2008 | Mueller |
| 2008/0301081 A1 | 12/2008 | Karnik et al. |
| 2009/0063562 A1 | 3/2009 | Dinger et al. |
| 2009/0094462 A1 | 4/2009 | Madduri |
| 2009/0319932 A1 | 12/2009 | Robinson et al. |
| 2010/0161577 A1 | 6/2010 | Morozov |
| 2011/0238637 A1 | 9/2011 | Morozov et al. |
| 2012/0259812 A1 | 10/2012 | Rangarajan et al. |
| 2013/0124681 A1 | 5/2013 | Rudenko et al. |
| 2015/0381419 A1 | 12/2015 | Kumar et al. |
| 2016/0196307 A1 | 7/2016 | Morozov et al. |

OTHER PUBLICATIONS

"BMC Atrium CMDB 7.5.00", User's Guide, 71 pages, Jan. 2009.
"BMC Atrium Core 7.6.00; Concepts and Planning Guide", (Sep. 2009), 1-164 pages.
"BMC Atrium Core 7.6.00; Normalization and Reconciliation Guide", (Sep. 2009), 1-148 pages.
"BMC Atrium Core 7.6.00; User's Guide", (Sep. 2009), 1-78 pages.
"Configuration Management Database (CMDB) Federation Specification", DMTF, Inc., Document No. DSP0252, Version 1.0.0, Jun. 22, 2013, 73 pages.
"The Four Challenges of Customer-Centric Data Warehousing", Carleton Corporation, Nov. 1998, 16 pages.
European Search Report dated Mar. 31, 2006 (05257483.7-2416 (149-0137EP)), 7 pages.

* cited by examiner

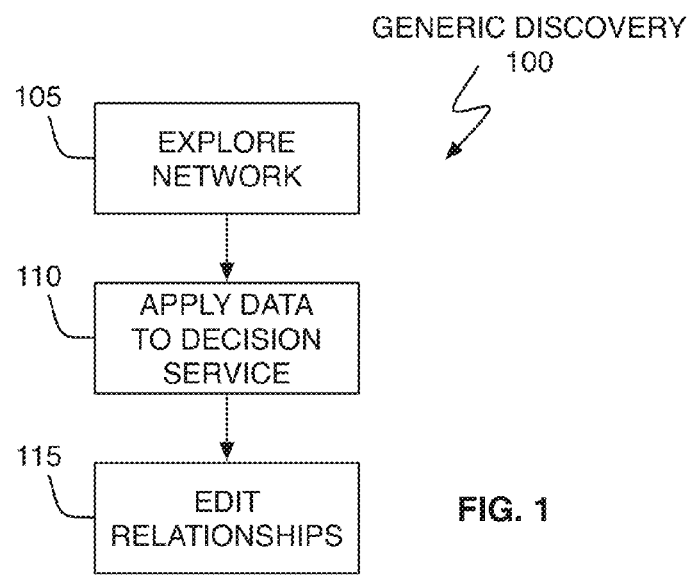
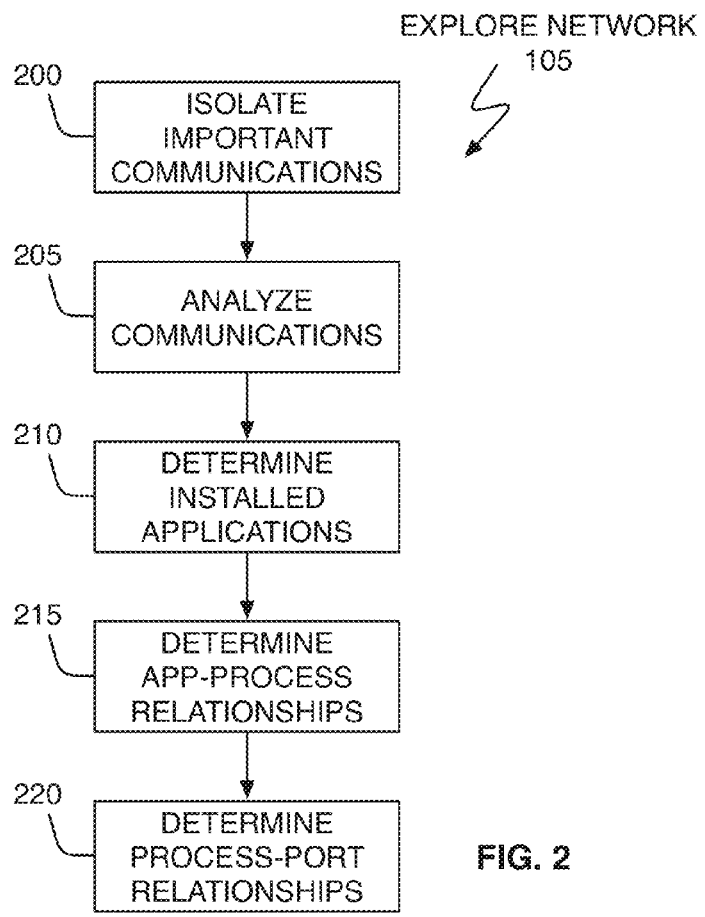

GENERIC DISCOVERY FOR COMPUTER NETWORKS

CROSS-REFERENCE TO RELATED APPLICATIONS

This application is a continuation of U.S. application Ser. No. 11/295,363, filed Dec. 6, 2005, which claims priority to U.S. provisional patent application entitled "Generic Discovery" (Ser. No. 60/633,625), "Topology Discovery" (Ser. No. 60/633,639) and "Change Configuration Management" (Ser. No. 60/633,640), all filed on 6 Dec. 2004, and which also claims priority to US applications entitled "Resource Reconciliation" (Ser. No. 11/204,189), filed 15 Aug. 2005 and "User Interface for Network Discovery Operations" (Ser. No. 11/295,364), filed 6 Dec. 2005. All of these references are hereby incorporated by reference.

BACKGROUND

The present disclosure relates generally to computer networks and, more particularly, to a techniques for generic discovery of a computer network.

The volume and rate at which hardware (e.g., computers, switches, routers and storage devices or systems) and software (e.g., user applications, application suites and environments such as order-entry and database management systems) are being deployed within business organizations is high and continues to grow. An essential aspect of managing this growth includes monitoring, controlling and documenting this deployment process to minimize potential outages, lower total operational costs, improve customer service and meet corporate compliance and security requirements. Knowledge of network topology or, more generally, information technology ("IT") infrastructure topology also permits one to understand how various components deliver business services to end users. This, in turn, can lead to improved management and greater efficiency in the use of such resources.

The task of identifying hardware and software components coupled to a network is often referred to as "discovery." It will be recognized that discovery can be a very complex operation—involving different types of hardware and software coupled via many different, and often unknown, network topologies. As used herein, the term "network" can mean a single network (local or wide area) or multiple separate networks coupled via any private (e.g., an intranet) or public (e.g., the Internet) network or any combination of private and public networks and using any suitable communications protocol and any media (e.g., wired or wireless). Illustrative communication protocols include, but are not limited to, Transport Control Protocol ("TCP"), Sequence Packet Exchange ("SPX"), User Datagram Protocol ("UDP"), Internet Protocol versions 4 or 6 ("IP" and "IPv6") and Internet Control Message Protocol ("ICMP"). As used herein, the term "component" means any hardware device (e.g., a computer system, storage device or switch) or software application (e.g., a database application, enterprise resource planning system or operating system) that may be detected by a network or IT infrastructure discovery action.

In prior art discovery systems, components may be identified by active scanning and/or through the use of specific queries. While these types of exploration can identify some components, they are not able to identify components that do not respond to such actions. These actions also do not identify the operational relationship between various components. Thus, it would be beneficial to provide a mechanism to facilitate the processing of discovery information so as to more fully identify network components and the operational relationships that exist between them.

SUMMARY

A system and method are disclosed for performing generic discovery of a computer network. In one embodiment, a generic discovery operation collects data related to computer network components using a variety of discovery technologies. Discovered components can be, for example, hardware, software or a collection of hardware and software. From the collected data, generic discovery operations determine information related to communications between various components and information related to applications on the components. Discovery operations in accordance with the invention preferably filter and analyze the communications to determine which communications are associated with the most contacted components and which communications are associated with ports related to a particular protocol or type of application.

Using the communication and application information, the inventive discovery operation determines relationships between those components of the computer network that have sufficient information available from the collected data. To qualify more components of the computer network, discovery operations may implement a decision service that is used to establish additional relationships. The decision system can use various algorithms that analyze the communications, installed applications, and ports used by components. From this analysis, the decision system generates hypothetical relationships between components that are known and components that are unqualified or unknown. The hypothetical relationships can be presented to a user for selection.

The foregoing summary is not intended to summarize each potential embodiment or every aspect of the present disclosure.

BRIEF DESCRIPTION OF THE DRAWINGS

FIG. 1 shows, in flowchart form, a generic discovery process in accordance with one embodiment of the invention.

FIG. 2 shows, in flowchart form, a network exploration method in accordance with FIG. 1.

DETAILED DESCRIPTION

Figure 3:
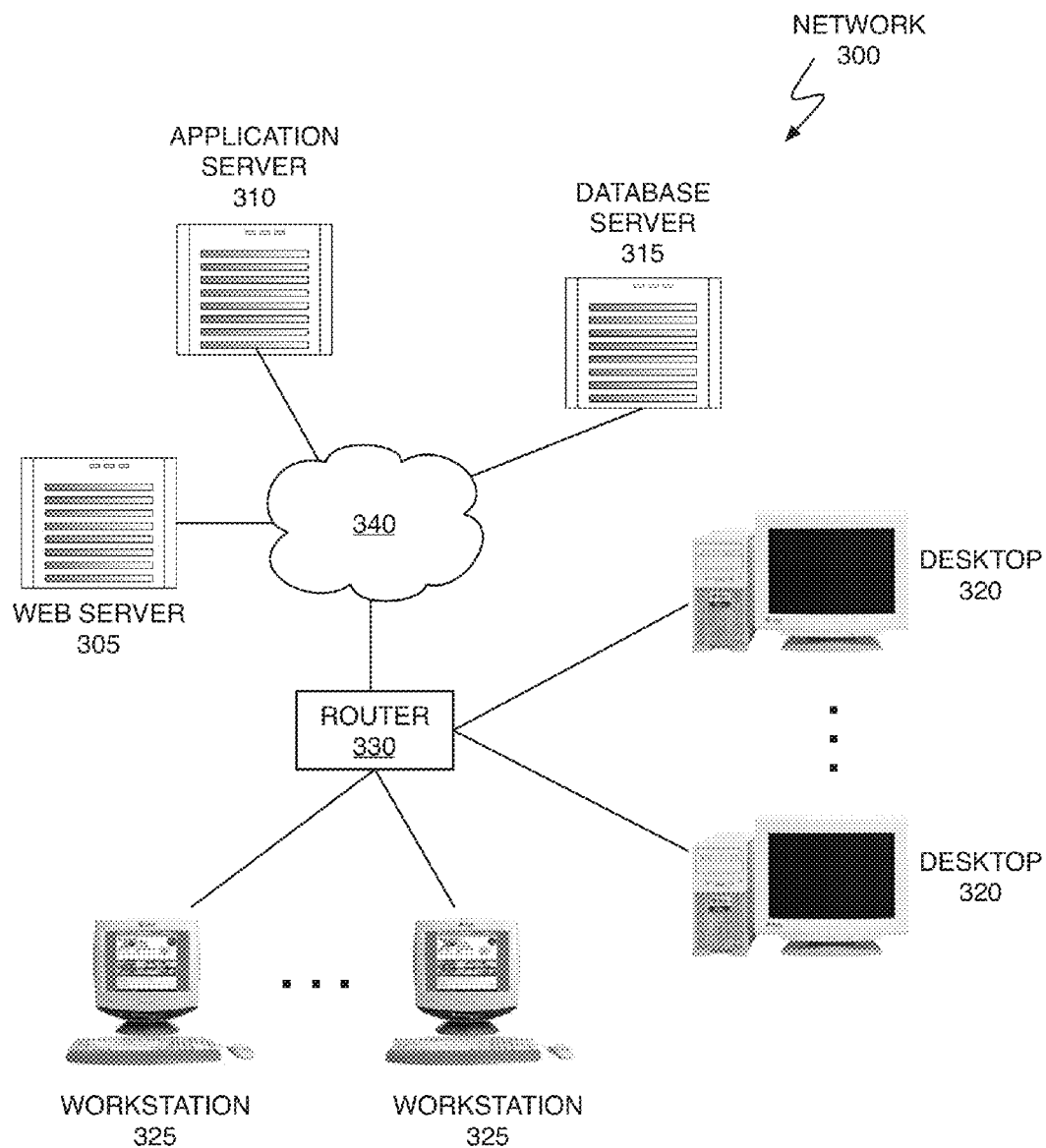
FIG. 3 shows, in block diagram form, an illustrative computer network.

New and useful methods, apparatus, systems and computer program products to capture discovery task information are described. The following descriptions are presented to enable any person skilled in the art to make and use the invention as claimed and are provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Referring to FIG. 1, generic discovery methodology 100 in accordance with one embodiment of the invention is shown. Initially, a specified network (or portion thereof) is explored (block 105)—details of which are provided below with reference to FIGS. 2-5. Network component information obtained, during the acts of block 105, are supplied to a decision service which determines various relationships between them (Block 110). Details relating to the decision service are discussed below with reference to FIGS. 8-9. Once relationships between the discovered components have been determined, generic discovery methodology 100 allows a user, such as a network administrator, to edit the discovered relationships (Block 115). Details relating to editing relationships provided by the decision service are discussed below with reference to FIG. 10.

As noted above, a generic discovery methodology in accordance with the invention (e.g., methodology 100) explores a computer network to determine and identify the various components that comprise the computer network. Referring to FIG. 2, one embodiment for performing the exploration acts of block 105 is shown in flowchart form. Network exploration begins by isolating important communications in the computer network (Block 200). Isolated communications may then be filtered and analyzed (Block 205). Next, applications installed on the various discovered components are determined (block 210). With the information provided in accordance with the acts of blocks 205 and 210, relationships between the applications and the processes that they generate (Block 215) and the relationships between the generated processes and the communication ports that they use are determined (Block 220). At the conclusion of the acts of block 220, at least a partial knowledge of the computer network's components and their relationships with one another have been determined. Yet, there are likely some components that have not been adequately discovered or are not properly or adequately typed or qualified.

To illustrate how generic discovery methodology 100 may, in accordance with one embodiment of the invention, "discover" network components, reference is made to FIG. 3—a schematic representation of network 300 comprising various components (e.g., web server 305, application server 310, database server 315, desktop computer systems 320, workstation computer systems 325, router 330 and interconnection network 340. The makeup, structure or landscape of the computer network 300 and of interconnection network 340 may be substantially unknown to an administrator before implementing generic discovery methodology 100.

As discussed previously, it is advantageous for an administrator to "discover" the hardware and software components of the computer network so that they can be better managed.

To determine the landscape of computer network 300, for example, applications that are hosted on various computers are discovered and the relationships and dependencies between the discovered applications are assessed. As described in more detail below, in the described embodiments, applications may be discovered by scripts/scanners or with explorations and are then filtered and inserted in a data store, repository or database for subsequent use.

Once portions of a network's landscape have been generically discovered, a resolver system may interact with the scanners during a resolving process to enrich the set of discovered applications or application-blocks if a discovery task requires it. As used herein, an application-block may be a single application hosted or executed on a single computer system, a single application hosted and executed on a plurality of computer systems, or multiple individual applications distributed across a computer network, wherein the individual applications communicate to perform a specified function. For example, a web server application and a database application that cooperatively supply a commercial web site with a specified business process (e.g., order entry) can be referred to as an application-block. In general, application-blocks can make use of any available communication protocol such as, for example, Simple Mail Transport Protocol ("SMTP"), Hyper Text Transfer Protocol ("HTTP"), Post Office Protocol ("POP3"), Database communication techniques such as Structured Query Language ("SQL") or other types of "middleware."

Figure 4:
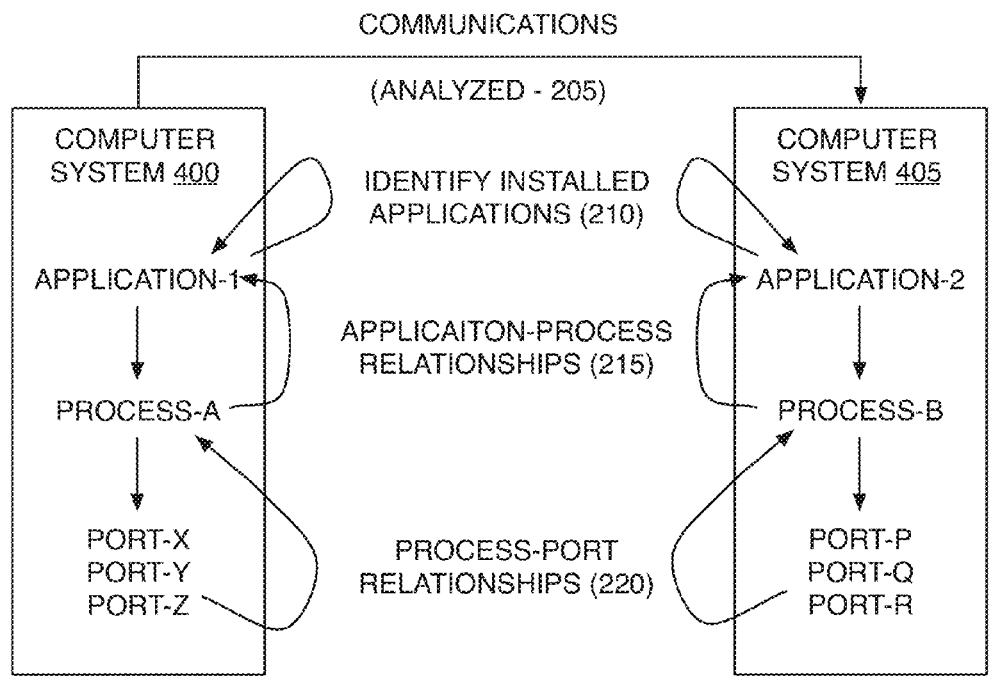
FIG. 4 shows, in block diagram form, two computer systems in communication.

Referring to FIG. 4, two computer systems 400 and 405 are shown in communication with one another. In accordance with the invention, data communicated between computer systems 400 and 405 is collected and analyzed (see block 205 in FIG. 2). Illustrative data includes, but is not limited to, information identifying applications installed and running on the computer systems (e.g., the name of the applications and the names of the processes linked to the applications—see block 210 in FIG. 2), operating system information (e.g., the type of operating system), communications information (e.g., Internet protocol identifiers and port numbers) including inter-process communication data ("IPC") that is exposed via, for example, the netstat command. As described above, this information may be used to identify relationships between the applications running on system 400 and those running on system 405, as well as between the applications and their associated processes (block 215 in FIG. 2), between the various processes and their ports (block 220 in FIG. 2) and between ports and the various protocols used for their communications.

During discovery, each data source provides a certain portion of its application, communication, and relationship information. However, not all of this information can be determined during discovery. Instead, the decision service described in more detail below may be used to determine a more comprehensive relationship between each discovered component of the network. The decision service can present hypothetical or proposed relationships if some necessary information needed to definitively determine a relationship is missing or is not directly discoverable.

Figure 5:
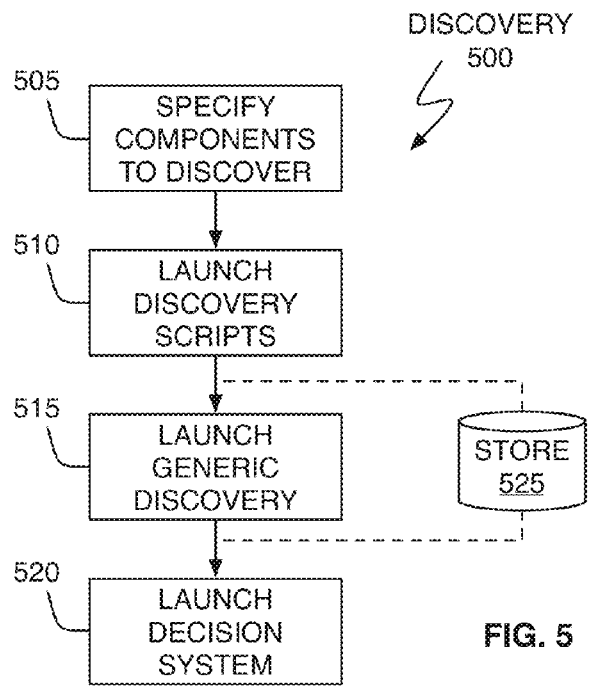
FIG. 5 shows, in flowchart form, a complete discovery process in accordance with one embodiment of the invention.

Referring to FIG. 5, discovery operation 500 using generic methodology 100 is shown. Initially, component discovery is initiated (block 505). During this phase, an administrator/user may select one or more types of components to discover. Illustrative components include SAP® systems and Java® platforms such as Java 2 platform enterprise edition or "J2EE®". (SAP is a registered trademark of SAP Aktiengesellschaft, a joint stock company of the Federal Republic of Germany. JAVA and J2EE are registered trademarks of Sun Microsystems, Inc. of Santa Clara, Calif.) Discovery operations in accordance with block 505 use one or more discovery technologies to collect data and information about computer network components. These discovery technologies include forms of exploration known in the art and, typically, use scripts or scanners, including, but not limited to, Secure Shell ("SSH"), Windows Management Instrumentation ("WMI"), Simple Network Management Protocol ("SNMP"), Transmission Control Protocol ("TCP") port scans, Structured Query Language ("SQL"), Remote Procedure Calls ("RPC"), and Distributed Computer Environment ("DCE") commands. In a preferred embodiment each of the discovery technologies identified here, and any others the administrator/user wants to use, is enabled by default during operations in accordance with methodology 100. Once selected, the scripts and/or applications are executed to perform the desired discovery (block 510). Typically, discovery scripts are executed to identify computer systems hosting interesting applications (as selected by the user during the acts of block 505) and can, and often do, execute scanners to intercept communications between various hosts using various forms of exploration (e.g., WMI, SNMP and SSH).

Data collected during the acts of block 510 may be retained in store 525. For example, a database or file. In addition to storing the identity of individual components, discovery scripts and scanners are also able to determine some relationships between the discovered components. This information is also retained in store 525. For example, prior art discovery techniques may identify SAP and J2EE applications as well as "vanilla" systems such as those executing Unix® or Windows® operating systems. (UNIX is a registered trademark of the American Telephone and Telegraph Company Corporation of New York, N.Y. WINDOWS is a registered trademark of the Microsoft Corporation of Redmond, WASHINGTON.) Yet, there are likely some components that have not been adequately discovered or are not properly or adequately typed or qualified.

Generic discovery operations (block 515) apply communication and qualification criteria to the collected data, identifying known application communication patterns to determine the hardware and software components of the computer network. Relationship information obtained during the acts of block 515 is included in store 525. Next, a decision service is launched to predict or infer relationships between the relatively unqualified or unknown components of the network (block 520). During discovery service operations, the user may be presented with the predicted or inferred relationships whereafter the user may confirm or modify the presented relationships (typically through a graphical user interface, "GUI").

As previously noted, discovery operation 500 in accordance with the invention uses one or more discovery technologies during the acts of blocks 505 and 510. Although features of these exploration technologies are known in the art, some of them are described herein for completeness.

In general, SQL exploration can be used for high-level dependency data sources. As used herein, the phrase "high-level dependency" refers to a dependency that contains a substantial amount of information. For example, a request on a database that specifies the clients connected to it represents a high-level dependency because it is known that the client is connected to a particular application on a specific port. During SQL Exploration, SQL access to databases can provide information on currently connected clients. This information can identify multi-tiered applications that use databases. With such information, discovery operation 500 can determine the clients that use a given database. To be effective, SQL exploration must first determine that a host system has a database, what type of database it is and the administrator login/password for access.

In general, remote connection exploration, SNMP exploration and TCP port scans can be used for low-level dependency data sources. As used herein, the phrase "low-level dependency" refers to a dependency that contains "poor" information. For example, a connection between two host computers with only the IP addresses and the source and destination ports represents a low-level dependency because the applications that dialog with one another and the kinds of protocols used are not known. During remote connection exploration, substantially all of the communication that a particular host computer manages may be captured.

During SNMP exploration, a "TCPConnTable" is preferably used. (It will be recognized that a "TCPConnTable" contains information about current TCP connections on a specific host system.) The states of interest are state 2 (listen) and state 5 (established). More particularly, the established state that specifies that a communication is between two processes or hosts is of interest. SNMP exploration requires that the hosts have SNMP agents activated and that the hosts know their community name. SNMP exploration can identify substantially all communications with established status that a particular host system manages to find a host-to-host connection.

During TCP port scan operations, applications may be identified by connecting to host system ports and capturing the responses to these connections form the host. Several techniques can be used to detect if a port is open or closed. Some of these techniques include standard TCP connects (tries to perform a full connection on a port), TCP SYN Scans (tries to perform a full connection to a port but aborts immediately at the first server response), TCP FIN Scans (sends a FIN packet on the port, wherein the server does not respond if the port is open, and sends an error otherwise), TCP Reverse Identity Scans (uses the identity protocol if active), and UDP Port Scans (results in an error message if packets are sent to a closed port). TCP port scanning techniques give information about the relationships between ports and the applications that use those ports. Preferably, TCP port scanning operations scan only a given list of ports. The list of ports can be determined contextually or can be obtained with the TCPConnTable, for example.

During SSH exploration, a secure terminal connection may be established that permits any desired shell action or command to be executed. During named pipe exploration it is possible to execute commands remotely on a host system. For example, the "netstat -an" command can obtain information concerning all of the communication that a host establishes. Alternatively, commands can be downloaded to a host, executed thereon and the results returned to the initiating process (i.e., discovery operation 500). With appropriate system commands that differ between different operating systems, it is possible to identify all the ports (listen and dynamic) of all processes executing on a host system.

Using exploration techniques such as those described above, discovery operation 500 can obtain data about a target computer network such as, for example, the operating systems on host systems, applications installed on host systems, relationships between applications on a host and the port(s) of another host, communications between port(s) on one host with port(s) on another host, and relationships between applications on one host with applications on another host.

Exploration operations in accordance with blocks 505 and 510 of FIG. 5 gather information about potentially thousands of TCP connections or other kinds of host-to-host and process-to-process communications. Not all of the TCP connections may be useful within the context of discovery operation 500. Accordingly, during generic discovery operations in accordance with block 515, TCP connections are first identified as communications between hosts. Then, a determination is made whether the communications are important or not. In addition, unqualified communications are qualified as being associated with a known application dependency. In other words, the detected communications may be filtered and analyzed, in accordance with techniques discussed below, to determine host-to-host relationships.

During generic discovery operations 515, a pair of hosts can be considered as communicating together if: (1) a communication on an identified protocol has been heard between them; or (2) a large number of unidentified communications (or communications on a potentially important port range) have been detected between those hosts. A given communication may be considered important if it: (1) is associated with a key communication protocol; (2) connects to a known application port important to discovery; or (3) connects a pair of important hosts on unidentified ports or through a range of ports that is potentially important. Moreover, an unqualified communication can be qualified as being communications associated with a known application dependency between hosts if the following situations occur: (1) the unqualified communications use a known port range and connect together two identified systems that host known applications types; (2) the unqualified communications are persistent on unknown port ranges between systems that host known services; (3) the unqualified communications are made within contiguous port numbers or within a narrow range of port numbers; or (4) the unqualified communications from different host systems converge to a single port on a known target/host system.

To identify such important communications, generic discovery operations in accordance with block 515 preferably use one or more filtering algorithms to extract communications from the pool of detected communications (and retained, for example, in store 525) and to develop a subset of communications that seem to play an important role in service of a delivery. In accordance with the invention, such important communications are selected and further enriched (typed/qualified) so that they can be added to store 525 and used in subsequent network management operations.

One such filtering algorithm is a conservative filtering algorithm. This algorithm browses the pool of communications captured between host systems and keeps only communications using ports that are defined by the user as important ports. A list of important ports can be stored in a file, preferably an XML file, so that the user can readily modify and adapt the file to a given network. Conservative filtering has been found to be useful for identifying important communications that are associated with a port in a LISTEN state.

A second type of filtering algorithm is an elimination filtering algorithm. This type of algorithm browses the pool of communications captured between host systems and removes all the communications using ports that are defined by the user as unimportant ports. The list of important port can also be stored in a file, such as an XML file, so that the user can modify and adapt it to a given network. Elimination filtering has been found to be useful in filtering out communications that are associated with a port in the ESTABLISHED state, but which are not of interest during discovery. For example, in a Windows operating environment, port 445 is used by the Microsoft Denial of Service process and offers no useful information for determining relationships between applications.

In addition to filtering algorithms, one or more analysis algorithms may be used to associate specific properties to hosts or to ports on hosts or are used to define the pool of communications more specifically. Properties retrieved in this way can be used to classify, order and enrich the knowledge of the computer network and can offer criteria for producing hypotheses or inferences about the relationships between applications.

One analysis algorithm is a port range detection algorithm. This type of algorithm uses a specific property of software communications to determine host-to-host relationships. Many forms of software/applications exchange data with the open dynamic ranges of ports of other applications in order to optimize their data flow. A range of ports has several ports that are not necessarily successive but are generally located in a short range of port numbers. Port range detection algorithms detect such ranges on each host and determine what other host or application is communicating with those ranges. Port range detection algorithms can be used to locate main server applications and establish the relationships between them.

A second analysis algorithm is a multiple client detection algorithm. These algorithms detect those host ports that are used to establish simultaneous connections with multiple "other" hosts. Such ports can be considered as entry ports to server applications. Multiple client detection algorithms are useful for detecting specific entry ports that are using uncommon port values. For example, a web server HTTP port configured on a different port value than 80 (the "expected" or "normal" port) is an uncommon port value, which can be an entry port of a server application.

A third analysis algorithm is a dual process communication detection algorithm. These algorithms detect those communications on an individual host that are established between processes on the host. Detected communications may be used to identify the processes on the host that are communicating and working together. Knowledge of such internal process communications may then be used to identify the relationships between the individual host and remote applications. For example, a host can have an Oracle database installed, and an application installed on the host can communicate with the Oracle database with a local dual process communication. In turn, the application on the host may communicate with peer applications on other host systems, and the relationship of the application with its peer applications can be identified using the detected communications of the host with its local Oracle database.

A fourth analysis algorithm is a communication flow detection algorithm. these algorithms analyze the quantity of communications established by a single host. Typically, server hosts in a production environment generate more communications than other hosts on a network. Accordingly, a prediction can be made as to the place of a given host in the production environment based on the amount of communications that host establishes.

A fifth analysis algorithm is an installed software detection algorithm. These algorithms analyze the software installed on a single host. Typically, server hosts in a production environment do not have the same types of applications installed on them as other hosts on a network. Predicting what applications are installed on a host, such as a server, can then be made based on a knowledge of the types of applications stored on various hosts commiserate with what quantity and types of communications are associated with those hosts.

Figure 6A:
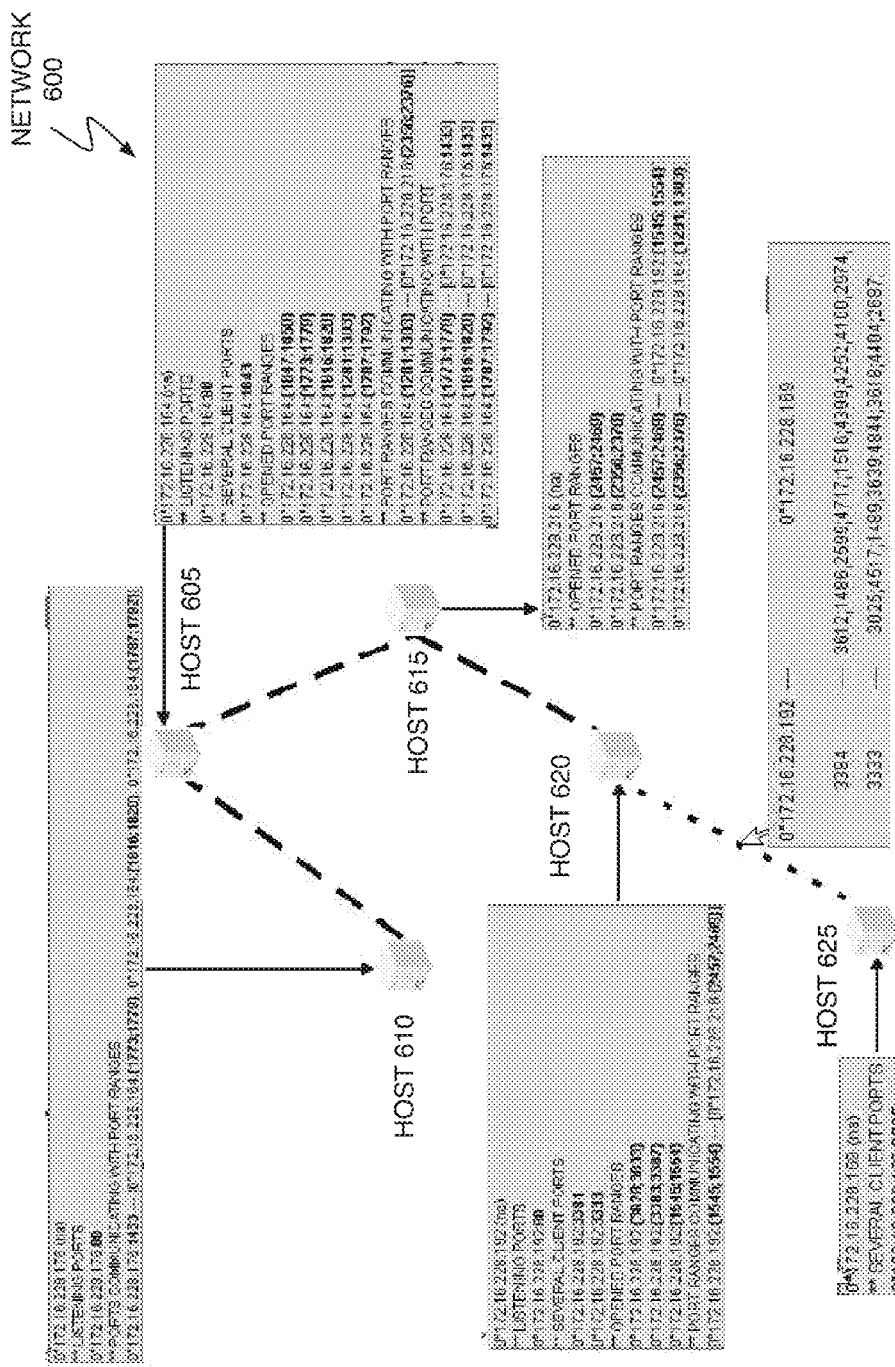
FIGS. 6A-6C show a network and associated discovered information in accordance with one embodiment of the invention.
Figure 6B:
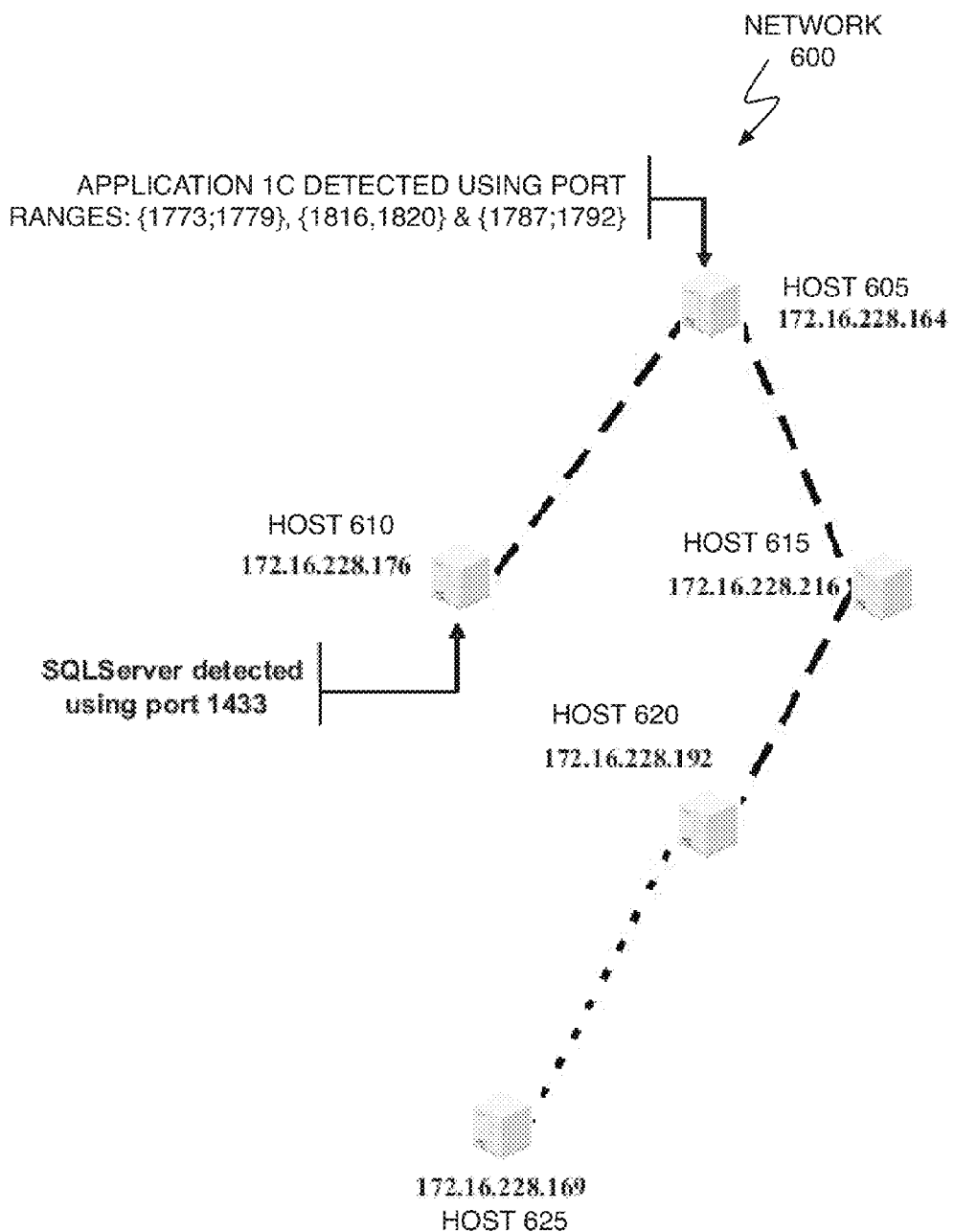
Figure 6C:
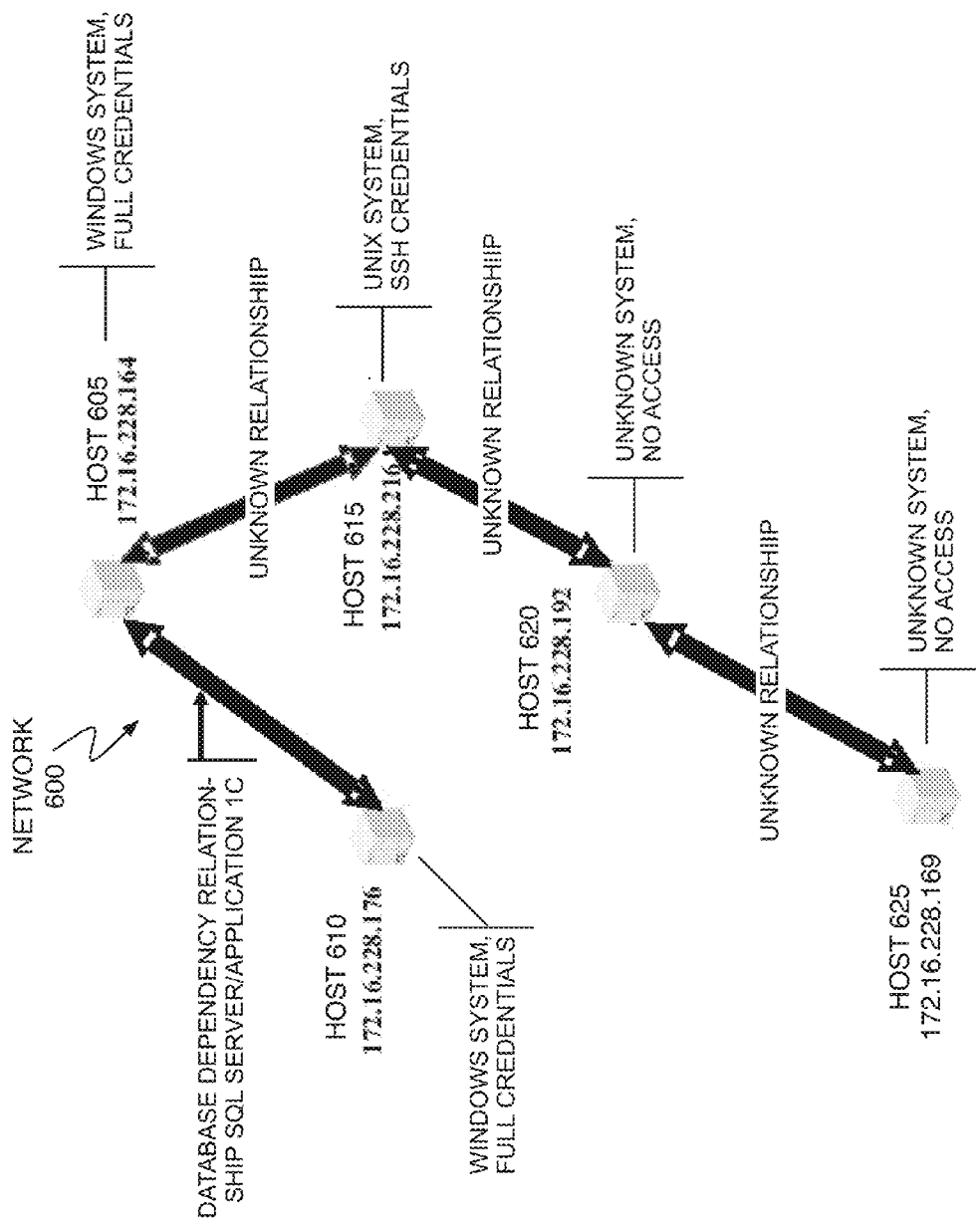

FIGS. 6A-6C show illustrative network 600 having various systems or host in various stages of analysis in accordance with generic discovery in accordance with the invention. Referring to FIG. 6A, each computer system 605-625 is shown with its network address, listening ports, open port ranges, client ports, those ports found to be communicating with port ranges of other hosts, and those port ranges found to be communication with ports of another host. Referring to FIG. 6B, using the filtering algorithms described above, it was determined that Application 1C (executing on host 605) is a SQL client application.

Referring to FIG. 6C, even after generic discovery operations 515 applies reliable information determined in accordance with the acts of blocks 505 and 510, some relationships between host systems are of unknown types (e.g., between hosts 605 and 610), and details of some of the hosts are not fully available (e.g., hosts 620 and 625). At this point, the generic discovery in accordance with the invention has explored the computer network, collected raw data and developed some host-to-host relationships using filter and analysis algorithms. However, the model of the computer network developed by such actions may remain incomplete in a number of respects (see, for example, FIG. 6C). To resolve this ambiguity, generic discovery methodology 515 may invoke or use a decision service to determine application-to-application relationships (see block 110 in FIG. 1 and block 520 in FIG. 5).

As described above, generic discovery methodology determines host-to-host relationships within a computer network by focusing on the types of communications that servers typically exchange. When two hosts are communicating together in a host-to-host relationship, it is probable that two or more pairs of applications are communicating at the same time between the two hosts. Accordingly, determining application-to-application relationships requires a determination of which applications are generating which communications between the hosts. Retrieving this information is possible but requires access to the hosts. If information as to which applications are generating which communications between hosts cannot be retrieved (i.e., because of lack of access), a decision service in accordance with the invention may be used to generate a plurality of hypotheses or inferences for such relationships.

Figure 7:
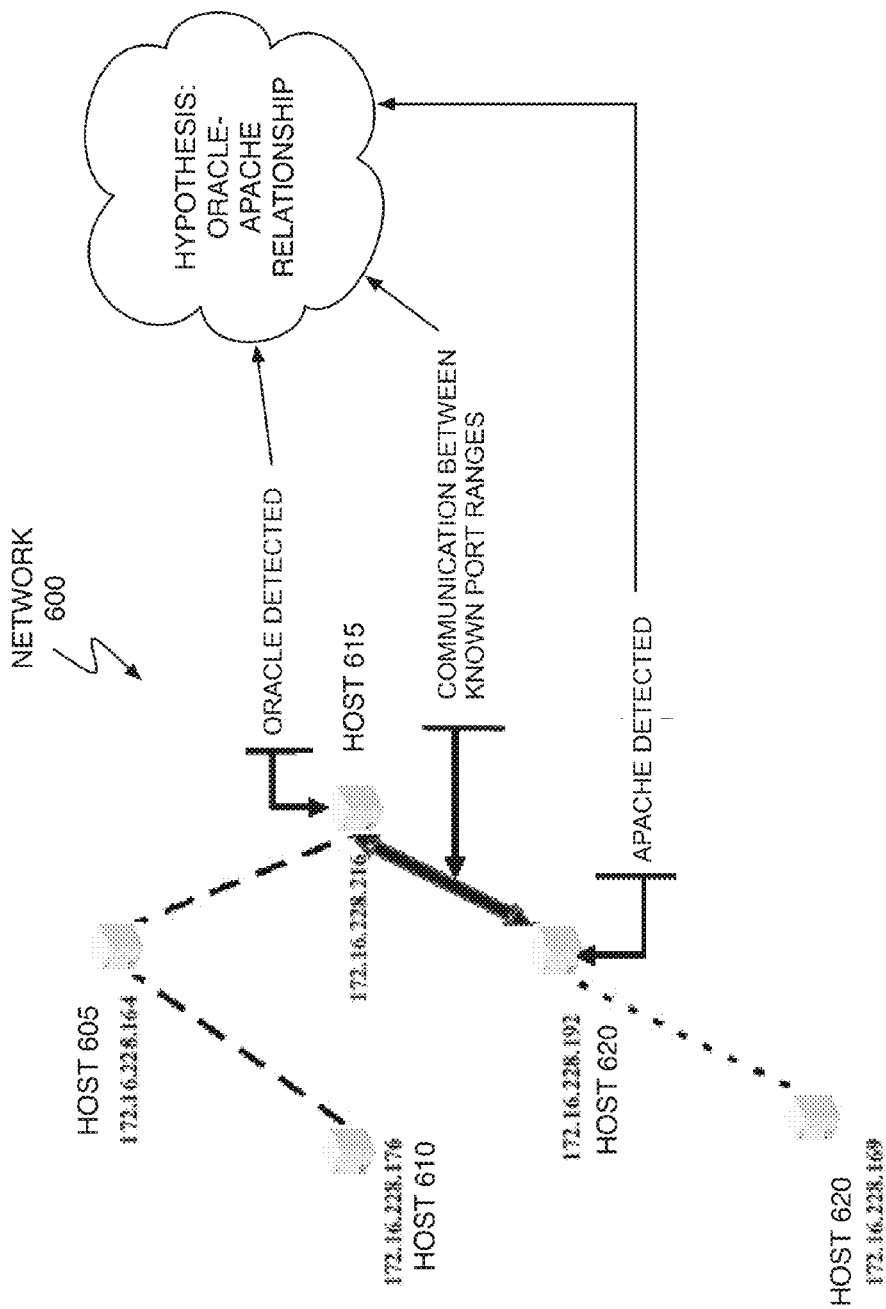
FIG. 7 shows an inferred relationship between two host systems in the network of FIG. 6.

Referring to FIG. 7, hypotheses for the relationship between host 615 and host 620 are shown based on detected applications executing on those hosts and the ports that are active between the two hosts. As shown in FIG. 7, based on having determined that an Oracle database in installed on host 615, that an Apache application is installed on host 620 and that communication between host 615 and 620 occurs over a port range typically associated with these applications, a decision service in accordance with the invention hypotheses or infers that an Oracle-Apache relationship exists between the two host systems. In one embodiment, this hypothesis is presented to the user through, for example, a graphical user interface. The user may then accept, reject or modify the relationship. In another embodiment, generic discovery methodology (in accordance with block 515) and decision service (in accordance with block 520) may automatically use the most likely hypothesis or inference to build a model of the network infrastructure.

A decision service in accordance with the invention (invoked during the acts of block 520) combines the information deter lined in accordance with blocks 510 and 515 with a knowledge of the way applications communicate with one another. In accord with this information, one or more hypothetical application-to-application relationship may be presented to the user. In a preferred embodiment, each hypothesis is associated with a value indicating its reliability.

Figure 8:
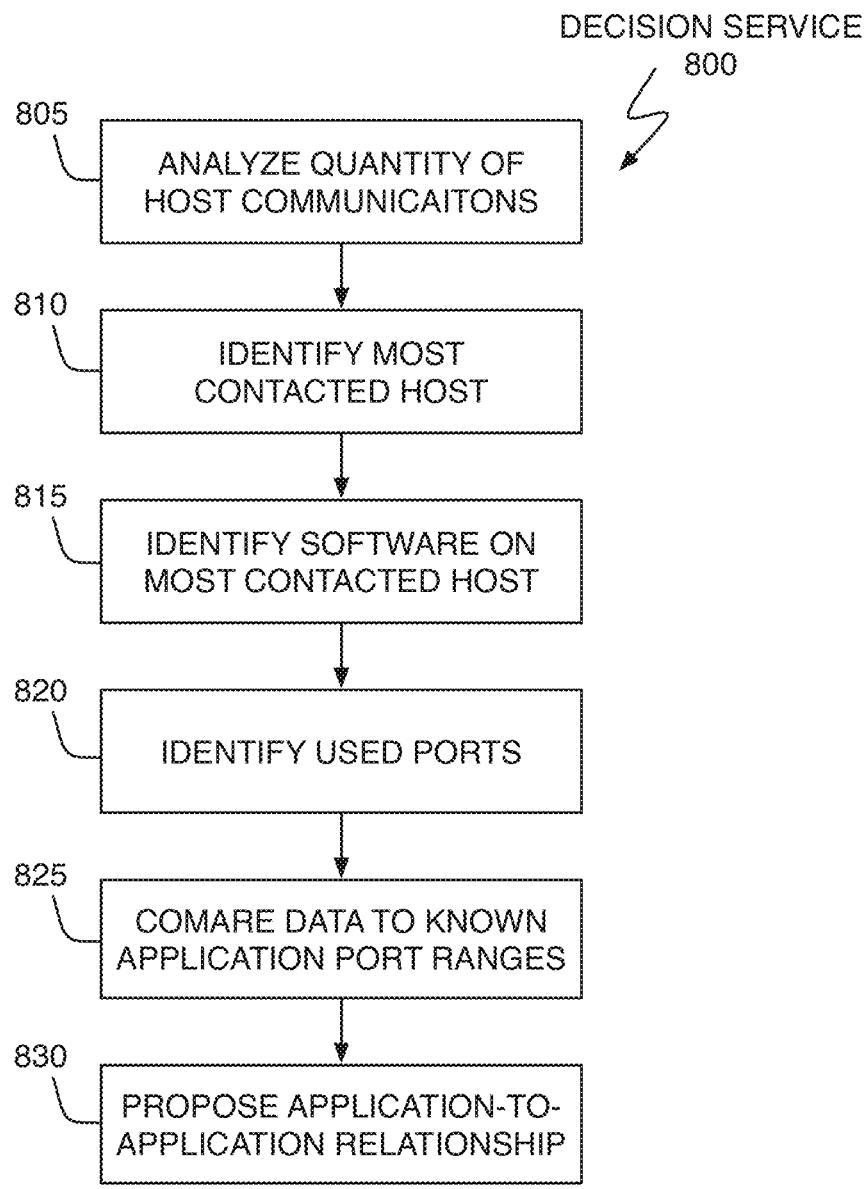
FIG. 8 shows, in flowchart form, decision service operations in accordance with one embodiment of the invention.

By way of example, consider FIG. 8 which shows how information and data may be used by decision service 800 in accordance with one embodiment of the invention to make hypotheses regarding application-to-application relationships in a computer network. Initially, the quantity of communications for a specified host is analyzed (block 805) to determine those host systems that are the most contacted hosts (block 810). For example, decision service 800 can compare the quantity of communications between the specified host and other hosts, selecting those that communicate more than a predetermined amount. Next, decision service 800 determines the installed software on the most contacted host (block 815). For example, a host may have one or more database applications (e.g., Oracle), server applications (e.g., Web), client applications as well as some relatively uninteresting types of applications such as, for example, a word processing application. Decision system 800 can then analyze the port ranges on the most contacted host to determine the ports used (block 820). Decision service 800 then compares the identified application and port information with information about which standard ports are used on different hosts by different applications (block 825). Based on this comparison, one or more proposed application-to-application relationships may be proposed (block 830). As noted above, the proposed relationships may be presented to a user or the most probable or likely one automatically selected. It will be recognized that the process outlined in FIG. 8 and described her may be repeatedly applied to determine or propose application-to-application relationships between a specified host system and a plurality of host systems.

While decision service 800 has been described as performing an ordered list of tasks (blocks 805-830), one of ordinary skill in the art will recognize that the described operations do not need to be performed in the described sequence. For example, data collected during network monitoring and/or exploration operations may be retained in, for example, store 525 (see FIG. 5). This data, whether obtained during exploration operations or some time later via database or file lookup operations, may be organized as Bayesian trees such that proposed relationships are identified as the most likely relationships (using, for example, Bayesian inference techniques).

Figure 9A:
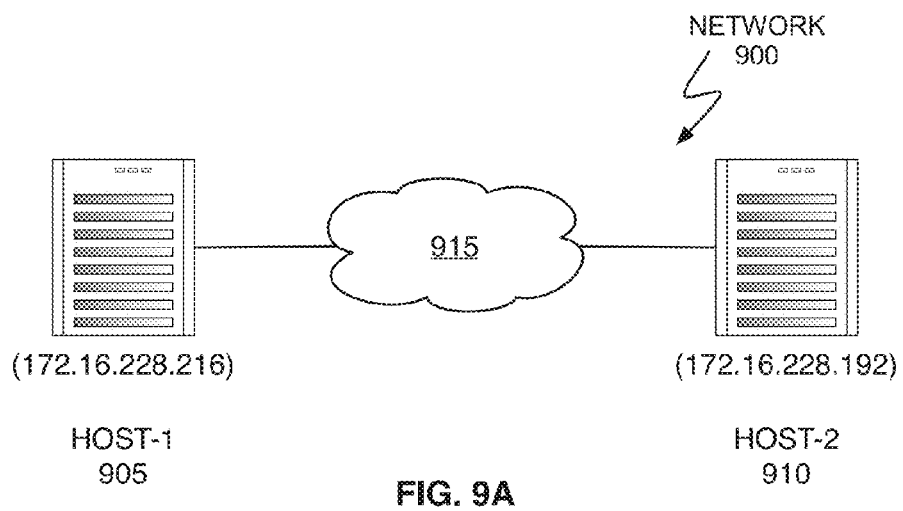
FIGS. 9A-9E show, in schematic form, the analysis of an illustrative network in accordance with one embodiment of the invention.
Figure 9D:
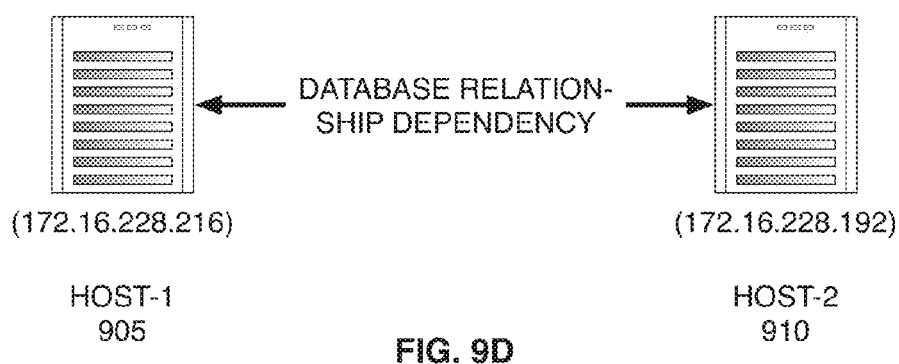
Figure 9E:
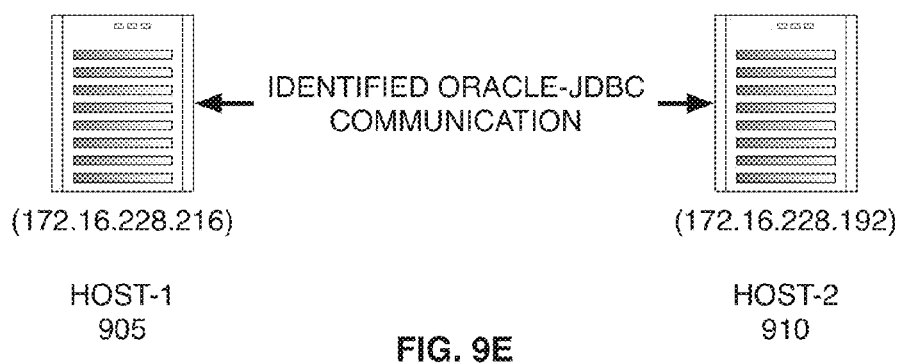
Figure 9B:
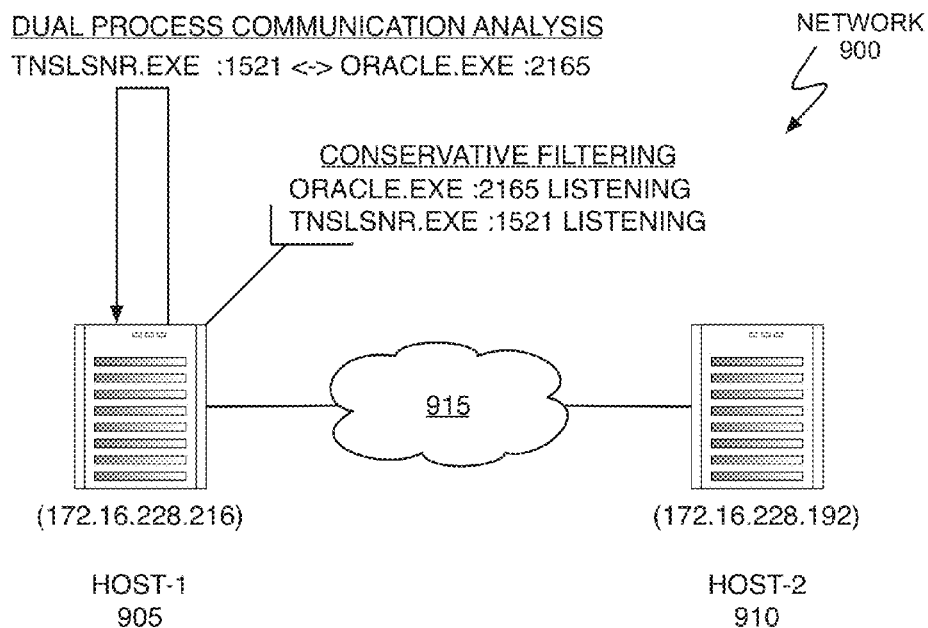

To further detail the inventive generic discovery methodology, consider FIGS. 9A-9E which illustrate the above-described filtering, analysis and decision algorithms described above. Referring first to FIG. 9A, example network 900 comprises host-1 905 and host-2 910 communicating via network 915. As described above, discovery information is initially obtained through exploration and scanners. In particular, generic discovery methodology in accordance with the invention obtains information on the communications between hosts 905 and 910, the applications installed on these hosts, and the ports used on these hosts. Exploration typically results in the collection of a large amount of data and information, only some of which may be useful. Filter algorithms are then be used to eliminate certain communications from the large amount of data that is not pertinent to the discovery operation. For purposes of this example, conservative and elimination algorithms may be used to filter the communications to those that are relevant to the two hosts under review. Next, the analysis isolates information contained in the filtered information that remains. For example, the analysis algorithms described above may be used to detect properties of computer network components and to highlight those components that are of interest (e.g., host systems 905 and 910). Data illustrative of these actions is illustrated in FIG. 9B.

Figure 9C:
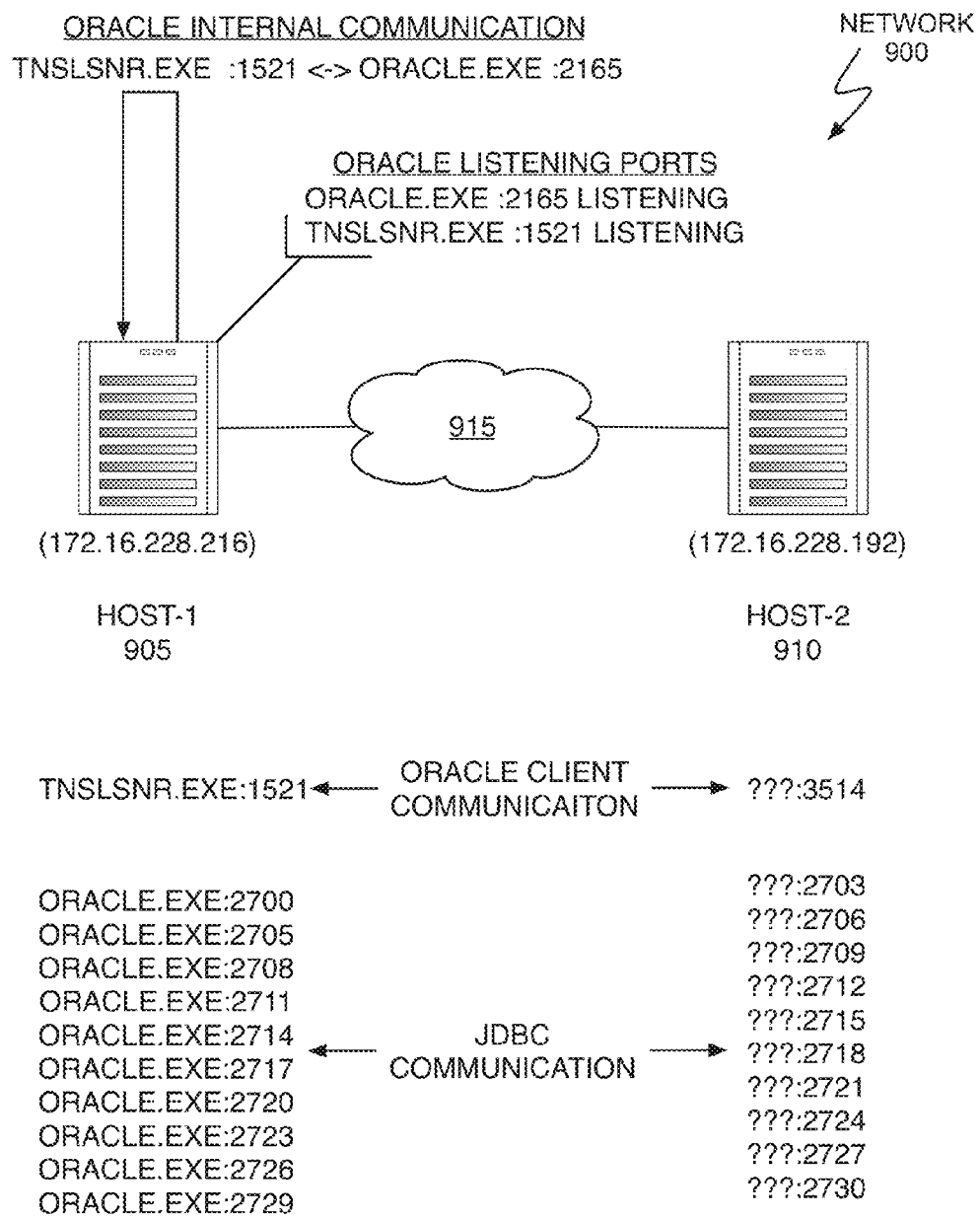

Applying the algorithms of decision service 800, the numerical data of FIG. 9B can be transformed into more useful information as illustrated in FIG. 9C. In this example, analysis of internal communications of host-1 905 determines that it is running an ORACLE database application. The listening ports for the Oracle database application are determined, and communication of the Oracle database application with a client, namely host-2 910, has been determined. Continuing to refer to FIG. 9C, this analysis has identified Oracle client communication between host-1 905 and a port of host-2 910, but host-2 910 has an unknown database client application that has not been determined by exploration and analysis. In addition, this analysis has determined that the Oracle database application uses a plurality of ports on host-1 905 to communication with a plurality of ports on host-2 910, but the relationship of the Oracle database application on the first host with an application on the second host is not yet known. However, analysis has determined that the communication between the ports on host-1 905 with the ports host-2 910 is most likely Java Database Connectivity ("JDBC") communications, which are used by an application program interface (API) to connect programs written in Java (i.e., the Oracle database application on host-1 905) to data in a database.

So far, this analysis leads to the qualification of the relationship linking host-1 905 and host-2 910 as a database dependency relationship as schematically shown in FIG. 9D. With the additional knowledge that one application (i.e., Apache/Tomcat) on host-2 910 can establish the JDBC communications, decision service 800 generates a hypothesis that Apache/Tomcat is in JDBC relationship with the Oracle database application on host-1 905 as shown in FIG. 9E. This hypothesis can be presented with a level of 80% of reliability, for example. Of course, for a given situation, decision system 800 can generate other hypotheses about the relationship between the hosts with other levels of reliability.

Figure 10A:
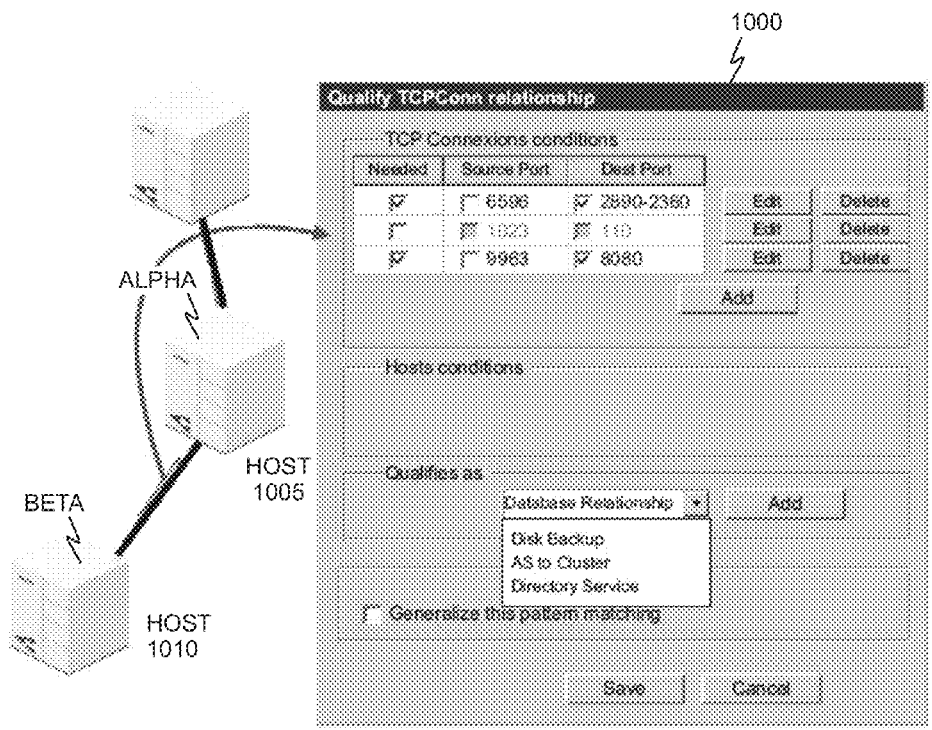
FIGS. 10A and 10B show illustrative user interface elements for use with a decision service in accordance with FIG. 8.

As previously described, decision service 800 generates hypotheses for a user to select. Referring to FIG. 10A, one embodiment of a discovery service user interface 1000 is shown through which the user may validate a proposed relationship between host systems 1005 and 1010. In FIG. 10A, generic discovery methodology in accordance with the invention has determined multiple connections to port 6596 from ports interval (2890-2360) between host 1005 and host 1010 hosting well-known applications ALPHA and BETA. These communications are determined to be of interest, and decision service 800 proposes to qualify the communications as a type of dependency that the user can define. To achieve this, decision service 800 may label all the unreliable dependencies determined through discovery as a type "temporary relationship." Information of these temporary relationships may be stored in, for example, store 525 (see FIG. 5). At the completion of generic discovery operations, temporary relationships require validation. Dialog 1000 is an example of an interface for this purpose a user. In dialog 1000, the user can qualify or define a TCP connection relationship categorized as a temporary relationship. Dialog 1000 allows the user to define which TCP connection conditions are needed for analysis and to qualify the relationship as one of a selection of relationships.

Figure 10B:
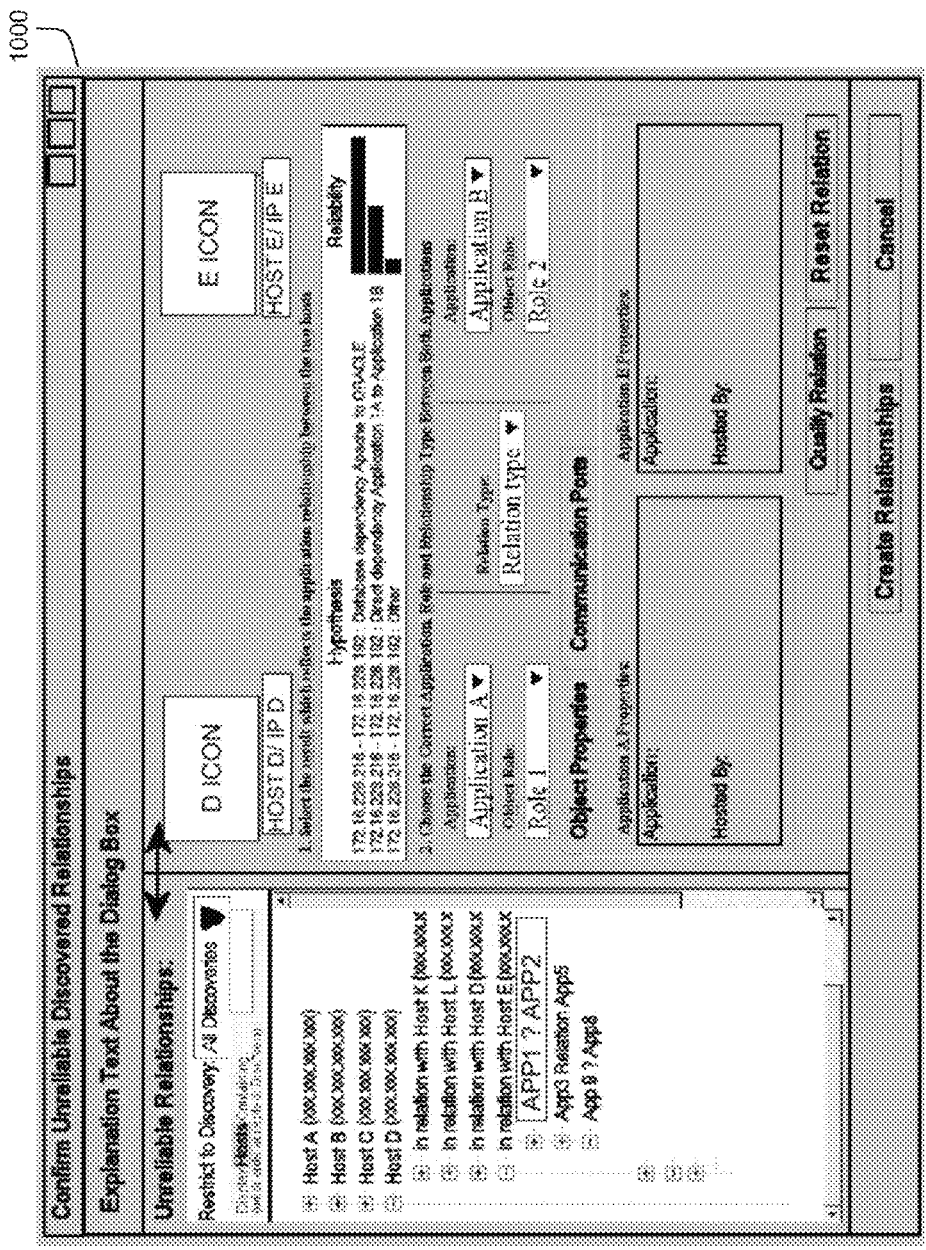

Referring now to FIG. 10B, dialog 1050 permits a user to define or qualify substantially unknown or unreliable relationships discovered in a computer network. In dialog 1050, an explorer interface lists the discovered hosts and their relationships. Information in the explorer interface can be filtered by, for example, restricting presentation of information to specific types of discoveries. In the example of dialog 1050, the user has elected to define or qualify a first Host-D in relation with a second Host-E and, specifically, a relationship of a first application App-1 to a second application App-2. In a first section, the dialog shows a plurality of hypotheses and associated reliability for the relationship to be qualified. The user is prompted to select the hypothesis that reflects the application-to-application relationship between the two selected hosts. In this example, the most reliable relationship has been determined to be a Apache-to-Oracle database dependency between host-A and host-B. After selecting the relationship, the user is prompted in the second section of dialog 1050 to choose the correct application, role, and type of relationship between both applications of the hosts. The fields in this second section can be populated with information relative to the choice of hypothesis made in the first section. For the benefit of the user, information on the object properties and the communication ports are provided. Ultimately, the user can qualify, reset, or create relationships with dialog 1050.

In another embodiment of the invention, generic discovery methodology can recognize application communications patterns to enhance the operation of decision service 800. For example, during exploration operations 105 (see FIGS. 1 and 2), store 525 (see FIG. 5) may be populated with application relationships and host systems in the form of connected graphs of network components. These connected graphs can be compared with predefined templates that reflect well-known application architectures. Decision system 800 could then select subsets of the connected graphs that match the predefined templates. In addition, decision system 800 could add information about the relationships it discovers to the same store. In this way, decision system 800 can determine that the components constitute a distributed application of a known type.

Figure 11C:
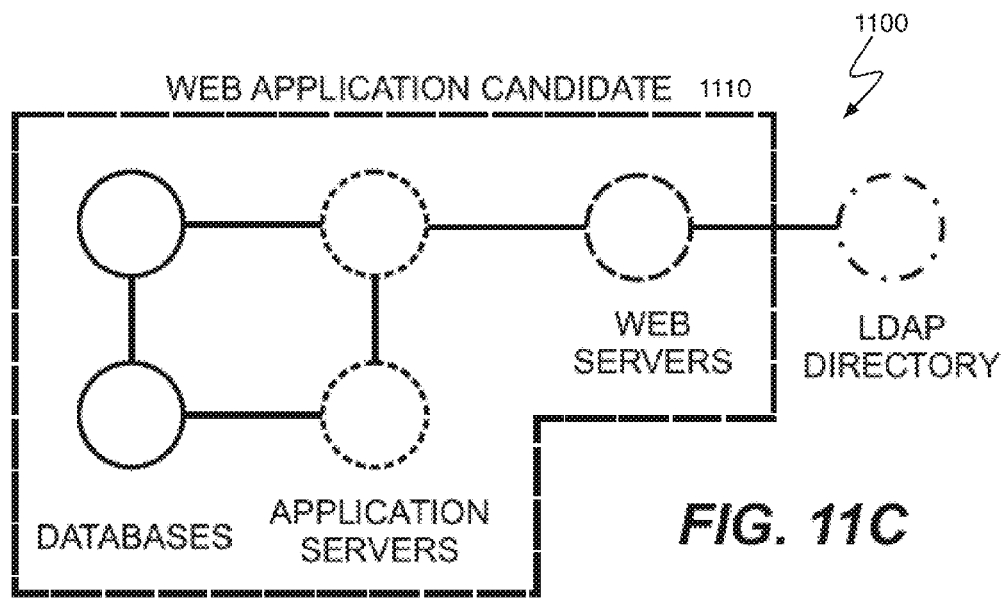
FIGS. 11A-11C illustrate a template matching process in accordance with one embodiment of the invention.
Figure 11A:
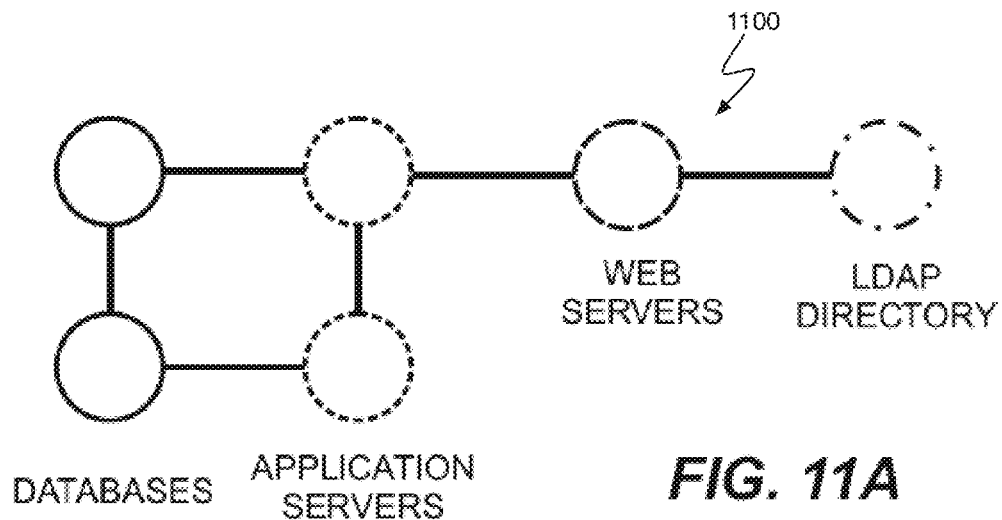

Referring to FIG. 11A, a plurality of distributed elements 1100 have been stored in a repository (e.g., store 525). Individual elements graph 1100 represent discovered applications and their relationships to one another. In this example, a database, an application server, a web server, and a Lightweight Directory Access Protocol ("LDAP") directory are shown. Decision system 800 determines that one or more subsets of graph 1100 constitute a well-know distributed application. To do this, decision system 800 stores, or has access to, definitions of well-known application architectures and compares them against the elements of graph 1100 to determine if some of the known architectures match portions of the graph.

Figure 11B:
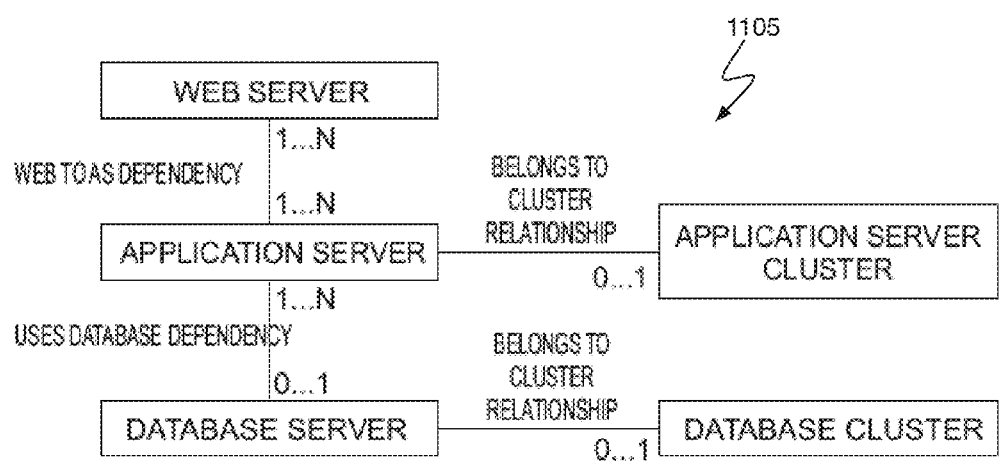

As one example, "web application" template 1105 may be defined as shown in FIG. 11B. Decision service 800 can use template 1105 as a model for recognizing "web applications" in a repository (e.g., store 525). Decision service 800 can apply template 1105 to graph 1100 of discovered applications and their relationships to determine that some elements comply with template 1105 while others do not, as shown in FIG. 11C. In this example, LDAP server has been left out of proposed Web Application 1110, because template 1105 for a Web Application does not include an LDAP server.

Matching templates of known application architectures to portions of the infrastructure discovered during generic discovery operations can be used to determine relationships between components of the computer network and to generate hypotheses about those relationships. Preferably, the templates are customizable by a user, such as an administrator. For example, the administrator can extend template 1105 for "Web Application" to include an LDAP server, if desired, so that the updated template can be used in later pattern matching operations.

Various changes in the materials and components as well as in the details of the illustrated operational methods are possible without departing from the scope of the following claims. For instance, the order of performing the described processes may be altered from that disclosed herein. By way of example, the acts of determining installed applications in accordance with block 210 in FIG. 2, may be done prior to or concurrently with other exploration actions of block 105. Further, acts in accordance with blocks 205-220 (see FIG. 2) and 515 (see FIG. 5) may be performed independently of other network exploration activities. That is, generic discovery operations in accordance with the invention may query previously discovered information rather than obtaining real-time discovery information through, for example, execution of applications and/or scripts as described herein (e.g., blocks 505 and 510). Yet further, decision system operations 520 and FIG. 8 may be performed independently of network discovery (blocks 105, 505 and 510) and/or generic discovery (block 515) operations. In addition, acts in accordance with FIGS. 1, 2, 5 and 8, interface elements in accordance with the concepts set forth in FIG. 10 and network and application templates of the sort shown in FIG. 11 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A component discovery method comprising:
   intercepting data communications occurring between a first computer system in a computer network and a second computer system in the computer network;
   identifying a sub-set of the intercepted data communications as important based on communication ports used in the data communications;
   identifying at least a first application on the first computer system by analyzing the important data communications; and
   generating a first hypothesis of an operational relationship between the first computer system and the second computer system based on the first application and the communication ports used by the important data communications.

2. The method of claim 1, wherein the important data communications include communications using pre-determined ports.

3. The method of claim 1, wherein communications using pre-determined ports are excluded from the important data communications.

4. The method of claim 1, wherein the first application is identified by determining that communication ports used by the first application in the important data communications match a range of ports used to communicate with a known application.

5. The method of claim 1, wherein the first application is identified by determining that communication ports used by the first application in the important data communications match ports known to be used to establish simultaneous connections with multiple other computer systems in the computing network.

6. The method of claim 1, further comprising:
   intercepting data communications occurring between applications on the first computer system; and
   identifying a second application on the first computer system by:
      determining that at least some of the intercepted communications occur between the first application and the second application, and
      determining that a type of the at least some important communications between the first application and the second application matches a known type of communications,
   wherein the first hypothesis is further based on the identity of the second application.

7. The method of claim 1, wherein analyzing the important data communications includes:
   determining listening ports used in the important communications;
   determining open port ranges used in the important communications;
   determining client ports used in the important communications; and
   determining ports of the first computer system used to communicate with port ranges of the second computer system.

8. The method of claim 1, wherein analyzing the important data communications includes:
   determining a network address of the first computer system and the second computer system.

9. The method of claim 1, further comprising building a model of an infrastructure of the computer network using the first hypothesis.

10. The method of claim 1, further comprising:
    generating a second hypothesis of a second operational relationship between the first computer system and the second computer system based on the first application and the communication ports used by the important data communications; and
    enabling a user to select a relationship from at least two generated hypotheses of relationships.

11. A network discovery system, comprising:
    a communication network; and
    a plurality of components operatively coupled to the communication network, the plurality of components including a first computer system and a second computer system, and at least one component being a computing device having at least one programmable control device and a storage device operatively coupled to the programmable control device, the storage device having stored therein instructions that, when executed by the programmable control device, cause the computing device to:

intercept data communications occurring between the first computer system and the second computer system, identify a sub-set of the intercepted data communications as important based on communication ports used in the data communications, determine an identity of at least a first application on the first computer system by analyzing the important data communications, and generate a first hypothesis of an operational relationship between the first computer system and the second computer system based on the identity of the first application and the communication ports used by the important data communications.

12. The network discovery system of claim 11, wherein the instructions further include instructions that, when executed by the programmable control device, cause the computing device to identify the first application by determining that communication ports used by the first application in the important data communications match a range of ports used to communicate with a known application.

13. The network discovery system of claim 11, wherein the instructions further include instructions that, when executed by the programmable control device, cause the computing device to identify the first application by determining that communication ports used by the first application in the important data communications match ports known to be used to establish simultaneous connections with multiple other computer systems in the communication network.

14. The network discovery system of claim 11, wherein the instructions further include instructions that, when executed by the programmable control device, cause the computing device to:

intercept data communications occurring between applications on the first computer system; and determine an identity of a second application on the first computer system by:

determining that at least some of the intercepted communications occur between the first application and the second application, and determining that a type of the at least some important communications between the first application and the second application matches a known type of communications associated with the identity of the second application, wherein the first hypothesis is further based on the identity of the second application.

15. The network discovery system of claim 11, wherein analyzing the important data communications includes:

determining listening ports used in the important communications;

determining open port ranges used in the important communications;

determining client ports used in the important communications; and determining ports of the first computer system used to communicate with port ranges of the second computer system.

16. The network discovery system of claim 11, wherein analyzing the important data communications includes:

determining a network address of the first computer system and the second computer system.

17. The network discovery system of claim 11, wherein the instructions further include instructions that, when executed by the programmable control device, cause the computing device to build a model of an infrastructure of the communication network using the first hypothesis.

18. The network discovery system of claim 11, wherein the instructions further include instructions that, when executed by the programmable control device, cause the computing device to:

generate a second hypothesis of a second operational relationship between the first computer system and the second computer system based on the first application and the communication ports used by the important data communications; and enable a user to select a relationship from at least two generated hypotheses of relationships.

19. A non-transitory computer-readable device comprising instructions stored on the computer-readable device for causing a programmable control device to:

identify TCP connections between a first computer system in a computer network and a second computer system in the computer network;

identify a set of communications using the TCP connections as important communications based on port information extracted from the communications;

identifying at least a first application on the first computer system by analyzing the important communications; and generating a first hypothesis of an operational relationship between the first computer system and the second computer system based on the first application and the ports used by the important communications.

20. The non-transitory computer-readable device of claim 19, wherein identifying the first application on the first computer system includes:

determining the port information for a particular data communication occurs in a known range; and determining that the first computer system and the second computer system are known to host particular application types.

21. The non-transitory computer-readable device of claim 19, wherein identifying the first application on the first computer system includes:

determining that at least some of the important communications are made within contiguous port numbers.

* * * * *